US011623138B2

(12) United States Patent
Yeh et al.

(10) Patent No.: US 11,623,138 B2
(45) Date of Patent: Apr. 11, 2023

(54) SCALABLE INTERACTIVE VIDEO SYSTEMS AND METHODS (71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 140 days.

(21) Appl. No.: 17/372,787

(22) Filed: Jul. 12, 2021

(65) Prior Publication Data
US 2021/0339128 A1 Nov. 4, 2021

Related U.S. Application Data (63) Continuation of application No. 16/268,129, filed on Feb. 5, 2019, now Pat. No. 11,083,961.
(60) Provisional application No. 62/783,544, filed on Dec. 21, 2018.

(51) Int. Cl.
A63F 13/33 (2014.01)
A63F 13/335 (2014.01)
(52) U.S. Cl.
CPC ............ *A63F 13/33* (2014.09); *A63F 13/335* (2014.09)
(58) Field of Classification Search
CPC ........ A63F 13/32; A63F 13/33; A63F 13/335; A63F 13/843; A63F 13/213; A63F 13/42; A63F 13/88; A63F 13/352; A63F 2300/203
See application file for complete search history.

(56) References Cited

U.S. PATENT DOCUMENTS

| | | | | |
|---|---|---|---|---|
| 6,543,053 B1* | 4/2003 | Li | ...................... | H04N 7/17318 348/E7.071 |
| 6,691,312 B1* | 2/2004 | Sen | ................... | H04N 21/64769 375/E7.013 |
| 7,072,971 B2* | 7/2006 | Lassen | ..................... | H04L 67/60 341/55 |
| 7,225,275 B2* | 5/2007 | Medin | ..................... | H04L 67/52 725/35 |
| 7,240,358 B2* | 7/2007 | Horn | ................... | H04L 12/1881 348/E7.071 |
| 7,337,231 B1* | 2/2008 | Li | .................... | H04N 21/47202 709/231 |

(Continued)

OTHER PUBLICATIONS

PCT/US2019/067632 International Search Report and Written Opinion dated Apr. 17, 2020.

*Primary Examiner* — David L Lewis
*Assistant Examiner* — Matthew D Hoel
(74) *Attorney, Agent, or Firm* — Fletcher Yoder, P.C.

(57) ABSTRACT

Present embodiments are directed to a distributed control system of an interactive video system. The distributed control system includes a switched fabric network, which includes an input node implemented to collect scanning data for a participant. The switched fabric network also includes a set of processing nodes implemented to generate a virtual representation for the participant based at least in part on the scanning data for the participant. Further, the switched fabric network includes an output node, which includes an output device implemented to present the virtual representation of the participant in a virtual environment.

20 Claims, 3 Drawing Sheets (56) References Cited

U.S. PATENT DOCUMENTS

| | | | | |
|---|---|---|---|---|
| 7,469,283 B2* | 12/2008 | Eyal | | H04L 65/60 |
| | | | | 707/E17.108 |
| 7,529,856 B2* | 5/2009 | Medin | | H04L 63/101 |
| | | | | 725/35 |
| 7,837,543 B2* | 11/2010 | Graepel | | G06N 3/006 |
| | | | | 463/7 |
| 8,103,799 B2* | 1/2012 | Medin, Jr. | | H04L 65/611 |
| | | | | 725/35 |
| 8,170,701 B1 | 5/2012 | Lu | | |
| 8,463,920 B2* | 6/2013 | Johnson | | H04L 45/30 |
| | | | | 709/229 |
| 8,495,233 B2* | 7/2013 | Lassen | | H04L 67/60 |
| | | | | 712/1 |
| 8,584,182 B2* | 11/2013 | Berberet | | H04N 5/765 |
| | | | | 725/88 |
| 8,671,163 B2* | 3/2014 | Luby | | H04L 69/14 |
| | | | | 709/219 |
| 8,825,887 B2* | 9/2014 | Jennings | | H04L 65/60 |
| | | | | 709/227 |
| 8,990,229 B2* | 3/2015 | Lafoucriere | | G06F 16/41 |
| | | | | 707/758 |
| 9,038,145 B2* | 5/2015 | Brown | | H04L 67/2885 |
| | | | | 713/160 |
| 9,135,635 B2* | 9/2015 | Jennings | | H04N 21/4623 |
| 9,136,878 B2* | 9/2015 | Luby | | H04L 1/0057 |
| 9,136,983 B2* | 9/2015 | Watson | | H04L 1/1607 |
| 9,178,535 B2* | 11/2015 | Luby | | H03M 13/6508 |
| 9,185,439 B2* | 11/2015 | Chen | | G11B 27/034 |
| 9,240,888 B2* | 1/2016 | Crowder, Jr. | | G06F 21/51 |
| 9,597,587 B2* | 3/2017 | Bathiche | | A63F 3/00529 |
| 10,653,957 B2* | 5/2020 | Cossairt | | A63F 13/213 |
| 11,083,961 B2* | 8/2021 | Yeh | | A63F 13/32 |
| 11,400,371 B2* | 8/2022 | Cossairt | | A63F 13/335 |
| 2002/0107968 A1* | 8/2002 | Horn | | H04N 7/17318 |
| | | | | 348/E7.071 |
| 2004/0010545 A1 | 1/2004 | Pandya | | |
| 2005/0245303 A1* | 11/2005 | Graepel | | A63F 13/833 |
| | | | | 463/1 |
| 2007/0155458 A1* | 7/2007 | Tipping | | A63F 13/573 |
| | | | | 463/6 |
| 2008/0045342 A1* | 2/2008 | Crowder, Jr. | | G06F 9/4403 |
| | | | | 717/176 |
| 2008/0086751 A1* | 4/2008 | Horn | | H04N 21/6408 |
| | | | | 348/E7.071 |
| 2009/0305790 A1 | 12/2009 | Lu et al. | | |
| 2009/0312096 A1 | 12/2009 | Kane et al. | | |
| 2012/0315965 A1* | 12/2012 | Bathiche | | A63F 3/00529 |
| | | | | 463/1 |
| 2013/0339857 A1* | 12/2013 | Garcia Bailo | | G06F 3/0484 |
| | | | | 715/723 |
| 2014/0165118 A1* | 6/2014 | Garcia Mendoza | | |
| | | | | H04N 21/26256 |
| | | | | 725/90 |
| 2014/0307798 A1* | 10/2014 | Taubman | | H04N 19/61 |
| | | | | 375/240.16 |
| 2018/0288133 A1 | 10/2018 | Colenbrander | | |
| 2019/0168120 A1* | 6/2019 | Cossairt | | A63F 13/843 |
| 2019/0172265 A1* | 6/2019 | Cossairt | | A63F 13/428 |
| 2019/0388783 A1 | 12/2019 | Godor et al. | | |
| 2020/0197793 A1* | 6/2020 | Yeh | | A63F 13/42 |
| 2020/0276501 A1* | 9/2020 | Cossairt | | G06T 15/08 |
| 2021/0158627 A1* | 5/2021 | Cossairt | | A63F 13/428 |

\* cited by examiner

SCALABLE INTERACTIVE VIDEO SYSTEMS AND METHODS

CROSS-REFERENCE TO RELATED APPLICATION

This application is a continuation of U.S. patent application Ser. No. 16/268,129, filed Feb. 5, 2019, and entitled, "Scalable Interactive Video Systems and Methods," which claims priority to and the benefit of U.S. Provisional Application No. 62/783,544, entitled "Scalable Interactive Video Systems and Methods," filed Dec. 21, 2018, which are incorporated by reference herein in their entirety for all purposes.

BACKGROUND

The present disclosure relates generally to video systems and, more specifically, to an interactive video game system that enables simultaneous multi-player game play.

Video game systems generally enable participants (e.g., players) to control characters in a virtual environment to achieve predefined goals or objectives. Traditional video game systems generally rely on manual input devices, such as joysticks, game controllers, keyboards, and so forth, to enable participants to control characters within the virtual environment of the game. Additionally, certain modern video game systems can include a camera capable of tracking the movements of participants, enabling participants to control video game characters based on their movements. However, these systems typically suffer from issues with latency and/or data throughput. For example, these systems may facilitate limited data collection and/or processing, which may limit the experience (e.g., graphics and/or effects) provided by the video game. Additionally, the processing time involved with controlling the video game may introduce delays between an input received from a participant and a resulting output. Further, in multi-participant video game systems, the potential for latency dramatically increases with the number of participants. Accordingly, using these systems to provide real-time interactive experiences that are smooth and responsive to participant interaction may be cumbersome.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments are directed to a distributed control system of an interactive video system. The distributed control system includes a switched fabric network interconnecting a plurality of nodes. The switched fabric network includes an input node, which includes a sensing unit. The sensing unit is implemented to collect scanning data for a participant of the interactive video system. Additionally, the switched fabric network includes a set of processing nodes. The set of processing nodes is implemented to generate a virtual representation of the participant based at least in part on the scanning data of the participant. The set of processing nodes is communicatively coupled to the input node via a first switch of the switched fabric network. Further, the switched fabric network includes an output node. The output node includes an output device implemented to present the virtual representation to the participant in a virtual environment. The output node is communicatively coupled to the input node via a second switch of the switched fabric network.

Present embodiments are also directed to a method of operating an interactive video system. The method includes collecting, at an input node of a plurality of nodes in a switched fabric network of a distributed control system of the interactive video system, scanning data for a participant of the interactive video system. The method also includes generating, at a first set of processing nodes of the plurality of nodes, a virtual representation of the participant based at least in part on the scanning data for the participant. The first set of processing nodes is communicatively coupled to the input node via a first switch of the switched fabric network. Further, the method includes presenting, using an output node of the plurality of nodes, the virtual representation of the participant in a virtual environment. The output node is communicatively coupled to the input node via a second switch of the switched fabric network. The method further includes determining, at a second set of processing nodes, a set of in-game effects based at least in part on the scanning data for the participant. Additionally, the method includes updating, using the output node, the virtual environment based at least in part on the in-game effects.

Present embodiments are also directed to an interactive video system that includes a distributed control system, which includes a switched fabric network interconnecting a plurality of nodes. The plurality of nodes includes an input node, which includes a sensing unit. The sensing unit is implemented to collect scanning data for a participant. The plurality of nodes further includes a set of processing nodes. The set of processing nodes are communicatively coupled to the input node via the switched fabric network. The set of processing nodes is implemented to generate a virtual representation for the participant based at least in part on the scanning data for the participant. The set of processing nodes is further implemented to determine a set of in-game effects based on the scanning data for the participant. The scanning data may include one or more in-game actions for the participant. The plurality of nodes additionally includes an output node. The output node is communicatively coupled to the input node via the switched fabric network. Further, the output node is communicatively coupled to the set of processing nodes via the switched fabric network, and the output node includes a set of output devices. The set of output devices are implemented to present the virtual representation of the participant in a virtual environment. The set of output devices are also implemented to update the presentation of the virtual environment based at least in part on the in-game effects.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As used herein, a "scanning data" refers to two-dimensional (2D) or three-dimensional (3D) data collected by sensing (e.g., measuring, imaging, ranging) visible outer surfaces of participants in a participation area. More specifically, "volumetric scanning data," as used herein, refers to 3D scanning data, such as point cloud data, and may be contrasted with "2D scanning data," such as image data.

As used herein, a "participant model" is a 2D or 3D model generated from the scanning data of a participant that generally describes the outer surfaces of the participant and may include texture data. More specifically, a "volumetric participant model" or "volumetric model," as used herein, refers to a 3D participant model generated from volumetric scanning data of a participant, and may be contrasted with a "2D participant model" that is generated from 2D scanning data of a participant.

A "shadow model," as used herein, refers to a texture-less volumetric model of a participant generated from the scanning data of a participant, either directly or by way of the participant model. As such, when presented on a 2D surface, such as a display device, the shadow model of a participant has a shape substantially similar to a shadow or silhouette of the participant when illuminated from behind.

A "skeletal model," as used herein, refers to a 3D model generated from the scanning data of a participant that defines predicted locations and positions of certain body parts and/or centers of mass (e.g., the torso, arms, legs, head) of a participant to describe the location and pose of the participant within a participation area. As such, the skeletal model is used to determine the movements and actions of participants in the participation area to trigger events in a virtual environment and/or in the participation area.

Present embodiments are directed to an interactive video system (e.g., a video game system) that enables multiple (e.g., 1 to 12) participants (e.g., players) to perform actions in a physical environment (e.g., participation area) to control virtual representations of the participants in a displayed virtual environment (e.g., presentation area). The disclosed interactive video system includes one or more sensing units, such as volumetric sensors (e.g., depth cameras and/or Light Detection and Ranging (LIDAR) devices), capable of scanning each of the participants and/or capturing in-procedure (e.g., in-game) actions of each of the participants. The interactive video system may also include a number of output devices, such as a display device, audio devices, physical effect devices, and/or the like capable of presenting the virtual environment and/or producing one or more in-procedure effects. Further, the interactive video system includes a distributed control system having a number of nodes (e.g., input nodes, processing nodes, database nodes, output nodes). The distributed control system may be implemented to control output devices based in part on input data received from the various sensing and input devices in the interactive video system. Accordingly, the interactive video system continuously updates the virtual representations of the participants and the virtual environment based on the actions of the participants and their corresponding in-procedure effects. Examples of present embodiments disclosed herein are described in the context of video games. However, it should be understood that present embodiments could be applied to and incorporate activities other than gaming activities. Further, it should be noted that the term video game broadly includes a large number of entertainment activities utilizing video technology.

Moreover, to create real-time interactive experiences that are smooth and responsive to participant interaction, the interactive video system may include a switched fabric network. The switched fabric network may include a number of nodes communicatively coupled together by a set of switches and interconnects, which may facilitate low-latency, high bandwidth communication. Additionally, the switched fabric network may support remote direct memory access (RDMA). The nodes of the switched fabric network may include the sensing and input devices, the output devices, the processing nodes, and/or the database nodes. For example, the sensing and/or additional input devices in the interactive video system may be implemented as one or more input nodes of the switched fabric network, while the output devices may be implemented as one or more output nodes of the switched fabric network. Certain processing nodes may include a specialized processor, such as a vector processing unit (VPU) and/or a tensor processing unit (TPU), which may be optimized to perform a specific function. Accordingly, certain processing nodes may be dedicated to performing certain processing tasks involved with the interactive video system, such as visual (e.g., graphics) processing, audio processing, artificial intelligence (AI) calculations, physics calculations, and/or the like, based on their respective capabilities. Further, the switched fabric network may divide these processing tasks among a number of suitable processing nodes. Moreover, the switched fabric network may facilitate remote direct memory access (RDMA). Accordingly, using RDMA, data may be transferred between physically separate processing nodes to perform a processing task with the latency of an internal computer bus, enabling nodes to seamlessly read information from and write information to other nodes in what effectively can be considered a large, combined memory space of all nodes in the switched fabric network. As such, the switched fabric network is able to efficiently process and update data used in the interactive video system. Further, the interactive video network can be effectively scaled as additional processing nodes, input nodes, and/or output may be added to the switched fabric network without incurring a substantial latency penalty.

Figure 1:
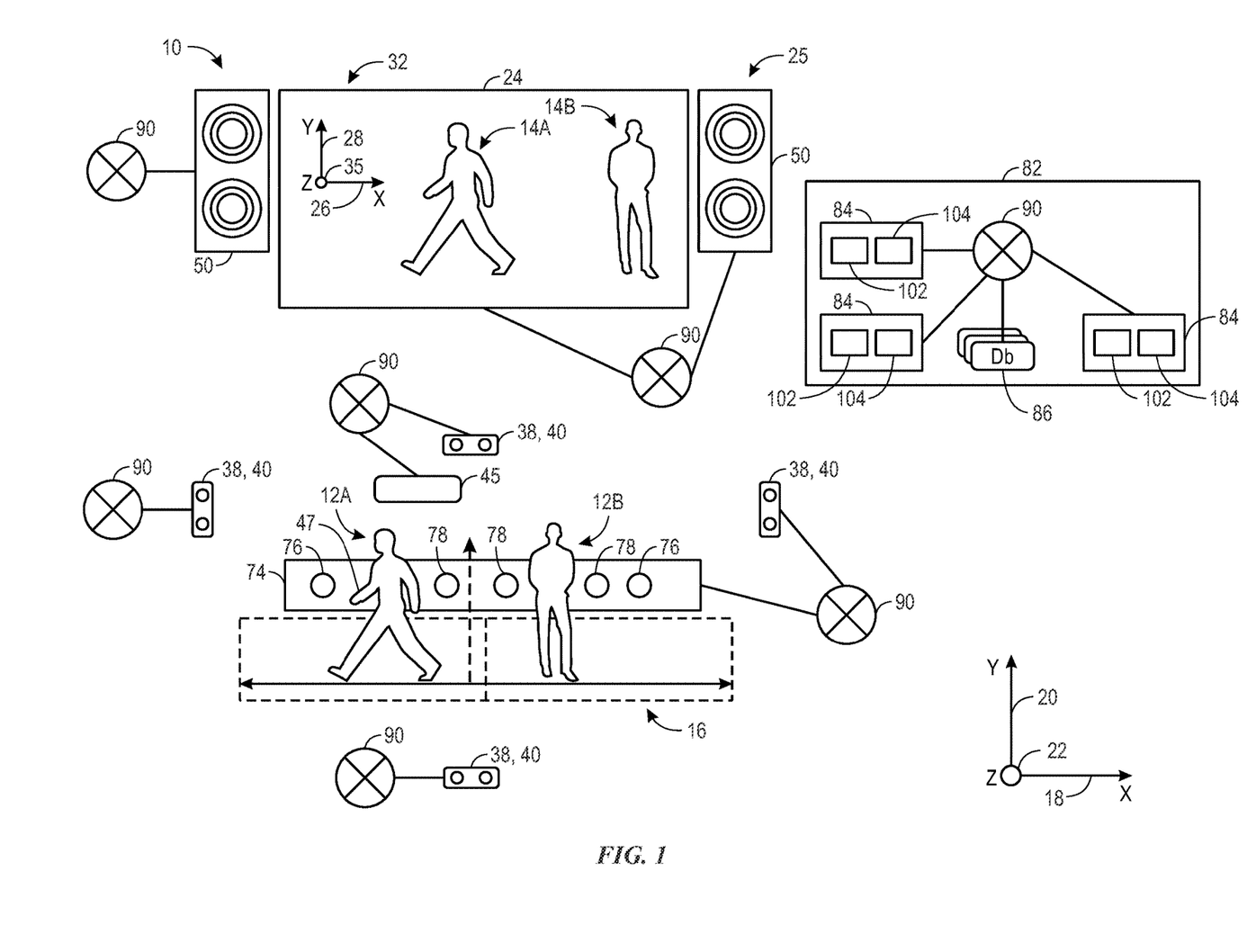
FIG. 1 is a schematic diagram of an embodiment of an interactive video system that enables multiple participants to control respective virtual representations by performing actions in a participation area, in accordance with the present technique.

With the foregoing in mind, FIG. 1 is a schematic diagram of an embodiment of an interactive video system 10 (e.g., a video game system) that enables multiple participants 12 (e.g., participants 12A and 12B) to control respective virtual representations 14 (e.g., virtual representations 14A and 14B) by performing actions in a participation area 16. It may be noted that while, for simplicity, the present description is directed to two participants 12 using the interactive video system 10, in other embodiments, the interactive video system 10 can support more than two (e.g., 6, 8, 10, 12, or more) participants 12.

The participation area 16 of the interactive video system 10 may have a width (corresponding to the x-axis 18), a height (corresponding to the y-axis 20), and a depth (corresponding to a z-axis 22), wherein the system 10 generally monitors the movements each of participants 12 along the x-axis 18, the y-axis 20, and/or the z-axis 22. The interactive video system 10 updates the location of the virtual representations 14 presented on a display device 24 of a presentation area 25 along the x-axis 26, the y-axis 28, and/or the z-axis 35 in the virtual environment 32 in response to the participants 12 moving (e.g., running along the x-axis 18, jumping along the y-axis 20, running along the z-axis 22) within the participation area 16.

The embodiment of the interactive video system 10 illustrated in FIG. 1 includes a number of sensing units 38 disposed within and/or around the participation area 16. More specifically, the sensing units 38 may be described as symmetrically distributed around a perimeter of the participation area 16. In certain embodiments, at least a portion of the sensing units 38 may be positioned above the participation area 16 (e.g., suspended from a ceiling or on elevated platforms or stands) and pointed at a downward angle to image the participation area 16. In other embodiments, at least a portion of the sensing units 38 may be positioned near the floor of the participation area 16 and pointed at an upward angle to image the participation area 16. In certain embodiments, the interactive video system 10 may include at least two sensing units 38 per participant (e.g., participants 12A and 12B) in the participation area 16. Accordingly, the sensing units 38 are suitably positioned to image a substantial portion of potential vantage points around the participation area 16 to reduce or eliminate potential participant occlusion.

In the illustrated embodiment, each sensing unit 38 includes a respective volumetric sensor 40, which may be an infra-red (IR) depth camera, a LIDAR device, or another suitable ranging and/or imaging device. For example, in certain embodiments, all of the volumetric sensors 40 of the sensing units 38 are either IR depth cameras or LIDAR devices, while in other embodiments, a mixture of both IR depth cameras and LIDAR devices are present. It is presently recognized that both IR depth cameras and LIDAR devices can be used to volumetrically scan each of the participants 12, and the collected scanning data (e.g., volumetric scanning data) can be used to generate various models of the participants, as discussed below. For example, in certain embodiments, IR depth cameras may be used to collect data to generate skeletal models, while the data collected by LIDAR devices may be used to generate volumetric and/or shadow models of the participants 12. It is also recognized that LIDAR devices, which collect point cloud data, are generally capable of scanning and mapping a larger area than depth cameras, typically with better accuracy and resolutions. As such, in certain embodiments, at least one sensing unit 38 includes a corresponding volumetric sensor 40 that is a LIDAR device to enhance the accuracy or resolution of the interactive video system 10 and/or to reduce a total number of sensing units 38 in the interactive video system 10.

Additionally, in certain embodiments, other sensing devices may be included in and around the participation area 16. For example, a radio-frequency (RF) sensor 45 may be disposed near (e.g., above, below, adjacent to) the participation area 16. The illustrated RF sensor 45 receives a uniquely identifying RF signal from a wearable device 47, such as a bracelet or headband having a radio-frequency identification (RFID) tag worn by each of the participants 12. In response, the RF sensor 45 provides signals regarding the identity and the relative positions of the participants 12 in the participation area 16, as described in greater detail below.

Additionally, the interactive video system 10 illustrated in FIG. 1 controls the output of stimuli (e.g., audio signals, video signals, lights, physical effects) at the presentation area 25 that are observed and experienced by the participants 12 in the participation area 16 as part of the virtual environment 32. As such, the presentation area 25 may include a number of audio devices 50 and/or a display device 24. The display device 24 may be any suitable display device, such as a projector and screen, a flat-screen display device, or an array of flat-screen display devices, which is arranged and designed to provide a suitable view of the virtual environment 32 to the participants 12 in the participation area 16. In certain embodiments, the audio devices 50 may be arranged into an array about the participation area 16 to increase participant immersion during game play.

Further, in one embodiment, the interactive video system 10 may include an interface panel 74 that can enable enhanced participant interactions. As illustrated in FIG. 1, the interface panel 74 includes a number of input devices 76 (e.g., cranks, wheels, buttons, sliders, blocks) that are designed to receive input from the participants 12 during game play. The illustrated interface panel 74 also includes a number of output devices 78 (e.g., audio output devices, visual output devices, physical stimulation devices) that are designed to provide audio, visual, and/or physical stimuli to the participants 12 during game play. For example, the output devices 78 may include audio devices, such as speakers, horns, sirens, and so forth. Output devices 78 may also include visual devices such as lights or display devices of the interface panel 74. In certain embodiments, the output devices 78 of the interface panel 74 include physical effect devices, such as an electronically controlled release valve coupled to a compressed air line, which provides bursts of warm or cold air or mist.

As further illustrated, the interactive video system 10 includes a distributed control system 82. The distributed control system 82 generally receives input information from the various aforementioned input devices and determines a suitable output based in part on the received input information. For example, the distributed control system 82 may receive the scanning data collected by each of the volumetric sensors 40, participant inputs from the input devices 76, the signals provided by the RF sensor 45 regarding the identity and the relative positions of the participants 12 in the participation area 16, and/or the like. The distributed control system 82 may combine this data, which is collectively described herein as "participant data", to determine the identities, locations, and/or actions of the participants 12 in the participation area 16 during game play. Moreover, the distributed control system 82 may determine instructions (e.g., control signals) to control the audio devices 50, the display device 24, the output devices 78, and/or the like to generate the various stimuli for the participants 12 to observe and experience via the presentation area 25. In some embodiments, the distributed control system 82 may determine the instructions to control the audio devices 50, the display device 24, the output devices 78, and/or the like, based in part on the collected participant data.

It is presently recognized that processing the collected participant data and/or determining the instructions to generate various stimuli in the presentation area 25 can be processor-intensive. Moreover, the latency of the interactive video system 10 may limit the ability of the interactive video system 10 to provide real-time interactive experiences that are smooth and responsive to participant interaction. Accordingly, in certain embodiments, it can be advantageous to divide the workload by utilizing a number of processors, communicatively coupled by a network, to process the collected participant data. As such, in the illustrated embodiment, the distributed control system 82 includes a number of processing nodes 84 and a database node 86 (e.g., a data repository) communicatively coupled together via a switched fabric network 90, such as an INFINIBAND® network. As described in greater detail below, the processing nodes 84 may include a memory 102 and/or a processor 104. As further illustrated, each of the input devices (e.g., volumetric sensors 40, RF sensor 45, input devices 76) and the output devices (e.g., audio devices 50, the display device 24, the output devices 78) of the interactive video system 10 is communicatively coupled to the switched fabric network 90. Accordingly, as described in greater detail below, the distributed control system 82 may transmit to and receive data from one or more devices in the interactive video system 10 via the switched fabric network 90.

Figure 2:
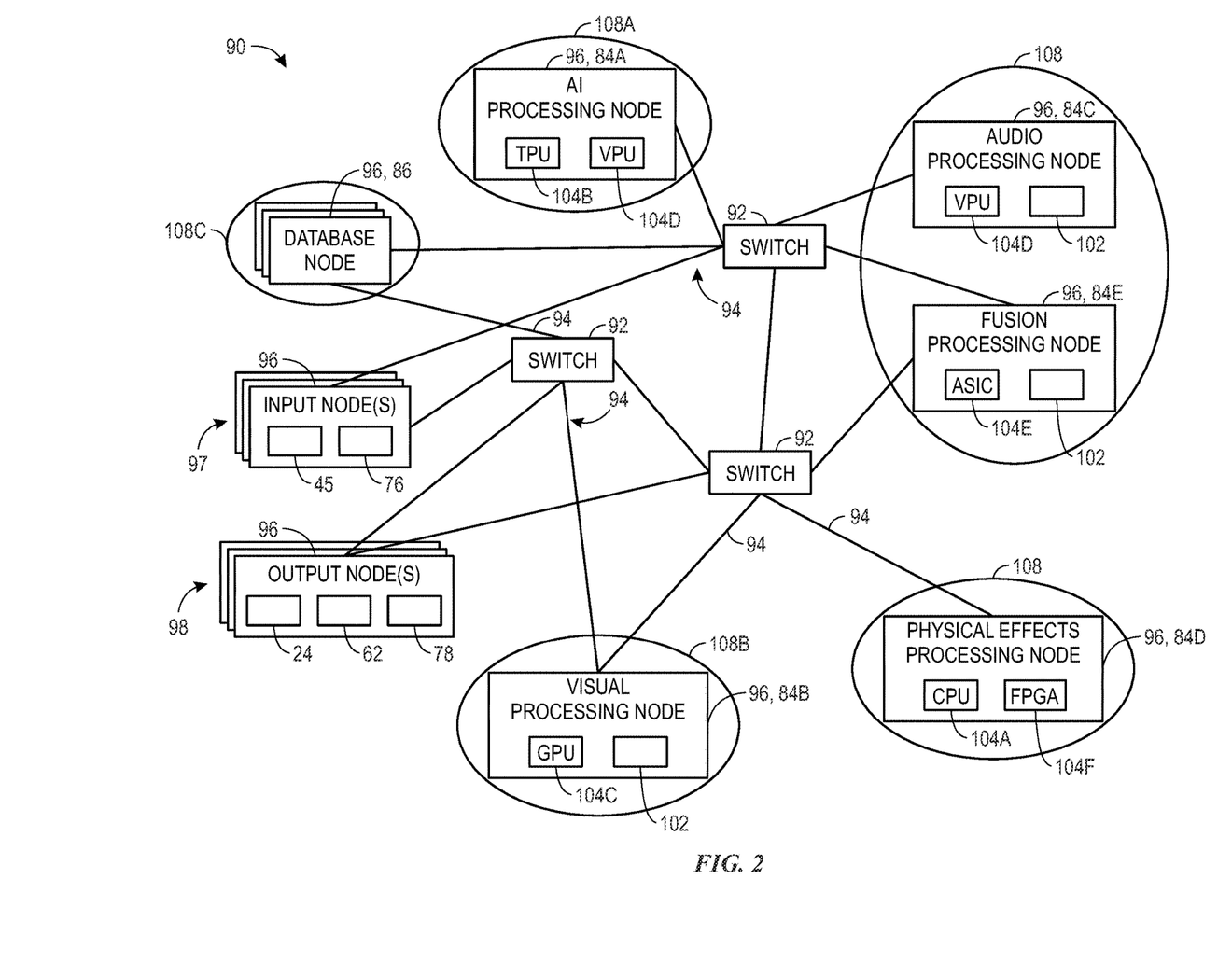
FIG. 2 is a block diagram of a switched fabric network, in accordance with the present technique.

To help illustrate, an embodiment of a switched fabric network 90 that includes a number of discrete nodes 96 is shown in FIG. 2. Using the switched fabric network 90, the data processing of the interactive video system 10 can be distributed between any suitable number of the discrete nodes 96, which may be physically distinct from one another, without introducing significant delay or latency. That is, for example, the interactive video system 10 may output stimuli and/or provide smooth and responsive movements of the virtual representations 14 in the virtual environment 32 to the participants 12 in real-time or near-real-time. As illustrated, each of the processing nodes 84 of the distributed control system 82 and the devices of the interactive video system 10 (e.g., sensing units 38, RF sensor 45, input devices 76, audio devices 50, the display device 24, the output devices 78, and/or the like) may represent a different node 96 of the switched fabric network 90. The input devices (e.g., volumetric sensors 40, RF sensor 45, input devices 76) are represented by input nodes 97, while the output devices (e.g., audio devices 50, the display device 24, the output devices 78) are represented by output nodes 98. However, it may be appreciated that each input and/or output device may be coupled to the switched fabric network 90 in different manners in other embodiments. In other words, embodiments described herein are intended to be illustrative and not limiting.

To communicatively couple the nodes 96 to one another, the switched fabric network 90 includes a number of switches 92 (e.g., switching devices). The illustrated switched fabric network 90 also includes a number of interconnects 94, which may represent wired and/or wireless connections. In one embodiment, an interconnect may include copper cables, optical cables, backplane connectors, and/or the like. The switches 92 may be implemented, in combination with the interconnects 94, to couple the distributed control system 82 and the devices (e.g., sensing units 38, RF sensor 45, input devices 76, audio devices 50, the display device 24, the output devices 78, and/or the like) of the interactive video system 10 to one another within the switched fabric network 90. For example, in one embodiment, the switches 92 may be hardware devices implemented to route a packet (e.g., a data packet and/or message) from a first device, such as a volumetric sensor 40, to a second device, such as a processing node 84. Moreover, using the interconnects 94 and the switches 92, the latency of the switched fabric network 90 may be less than or equal to 1 microsecond (μs). The switched fabric network 90 may also facilitate a high bandwidth connectivity. As such, a high volume (e.g., throughput) of data may be relayed between devices with low latency, which may facilitate the real-time data collection and processing involved with the interactive video system 10.

The switched fabric network 90 may also facilitate remote direct memory access (RDMA) for both read and write operations between and/or within nodes 96. Accordingly, data may be written directly to the memory 102 of a device from any suitable node 96 of the switched fabric network 90. For example, a first node 96 (e.g., a processing node 84) may directly access the memory 102 of a second node 96 (e.g., one of the output nodes 98) to read or update data using low-level requests (e.g., at a network layer or a transport layer) without involving higher-level requests (e.g., at an application layer or a presentation layer) or the additional overhead associated therewith. Further, in some instances, a result, which may be computed at the first node 96 can be directly written to memory of a dependent node 96, such as the second node 96. As a result, the latency of the switched fabric network 90 and the interactive video system 10 may be minimized (e.g., to be less than 5 microseconds (μs), less than 3 μs, less than 1 μs, less than 0.5 μs). Moreover, the nodes 96 of the switched fabric network 90 may be physically distinct (e.g., separate) from one another without incurring additional latency. Accordingly, in some embodiments, each of the processing nodes 84 may be housed in a separate chassis 108. For instance, a first chassis 108A may include the AI processing node 84A, a second chassis 108B may include the visual processing node 84B, and a third chassis 108C may include the database node 86. Further, the chassis 108 (e.g., 108A, 108B, 108C) may be remote from one another. For example, the first chassis 108A may be disposed proximate to the participation area 16 and/or presentation area 25, while the second chassis 108B may be disposed at an off-site location that is remote from the participation area 16 and/or presentation area 25. Additionally or alternatively, a number of processing nodes 84, input nodes 97, and/or output nodes 98 may be housed in a single chassis 108, or in distinct chassis that are disposed in a common location (e.g., a control area of the interactive video system 10).

A processing node 84 and/or a cluster (e.g., group) of processing nodes 84 may be implemented to handle a certain processing task. Accordingly, as discussed above, certain illustrated processing nodes 84 may include a memory 102 and/or a processor 104. More specifically, in some embodiments, the processor may be implemented as a central processing unit (CPU) 104A and/or a specialized processor, such as a tensor processing unit (TPU) 104B, a graphics processing unit (GPU) 104C, a vector processing unit (VPU) 104D, an application-specific integrated circuit (ASIC) 104E, a field-programmable gate array (FPGA) 104F, and/or the like, optimized to perform the processing task.

Accordingly, information, such as participant data, collected at the input nodes 97 may be selectively routed to a set of processing nodes 84 implemented to perform a certain task using the information. For example, an artificial intelligence (AI) processing node 84A, which may be include a TPU 104B and/or a VPU 104D, may determine participant data collected at the input node 97 by accessing (e.g., reading) the information at one of the input nodes 97 via RDMA. In some embodiments, for example, the AI processing node 84A may construct a participant model, predict future actions performed by the participant 12, determine an opponent to present to the participant 12, and/or the like based in part on the collected participant data and a set of inference computations. Moreover, as described below, the AI processing node 84A may identify in-game actions of the participant based on the collected participant data and may determine one or more in-game effects corresponding to the in-game actions. Further, a visual processing node 84B, which may include a GPU 104C, may determine an output signal to cause the display device 24 to present and/or update the virtual representations 14 of each of the participants in the virtual environment 32 based in part on the collected participant data and/or the in-game effects. Moreover, an audio processing node 84C may determine an output signal to cause the audio devices 50 to produce particular audio stimuli based in part on the collected participant data and/or the in-game effects. Additionally, a physical effects processing node 84D may determine an output signal to cause the output devices 78 to produce one or more physical effects, such as providing a burst of air, based in part on the collected participant data and/or the in-game effects.

Further, in some embodiments, the switched fabric network 90 may include a fusion processing node 84E, which may represent a processing node 84 implemented to aggregate data from a variety of sources. For example, in some embodiments, the fusion processing node 84E may aggregate collected participant data from a sensing unit 38 and RF sensor 45 to determine the position of a participant. Moreover, in some embodiments, the fusion processing node 84E may aggregate output data, such as multiple audio and/or visual signals, before they are routed to the output nodes 98 to be generated by one or more output devices. Accordingly, in some embodiments, other processing nodes 84 may receive participant data from the fusion processing node 84E and/or may output data to the output node 98 via the fusion processing node 84E.

Because the nodes 96 may be physically remote from one another, and because the disclosed switched fabric network 90 mitigates latency and supports high data throughput, the interactive video system 10 may be readily scaled. For example, in some embodiments, to accommodate additional participant data, which may be produced by additional participants 12, processing may be offloaded to additional processing nodes 84. More specifically, the additional processing nodes 84 may be added to the switched fabric network 90 to accommodate the additional participant data. Moreover, as discussed above, any of the processing nodes 84 may be located remotely from the participation area 16 and/or presentation area 25. Accordingly, the addition of additional processing nodes may not be limited by the resources (e.g., area and/or volume) of the participation area 16 and/or presentation area 25, as another location may house the additional processing nodes.

As further illustrated, the switched fabric network 90 may include redundant interconnects 94. For example, certain nodes 96 may be communicatively coupled to multiple switches 92 (e.g., switches 92A, 92B, and/or 92C). Additionally or alternatively, a switch 92A may be communicatively coupled to multiple other switches 92 (e.g., switches 92A, 92B, or 92C). Accordingly, multiple different paths to route data between switches and/or between nodes 96 may be formed. To that end, the switched fabric network 90 may reduce and/or eliminate undeliverable messages (e.g., data packets), as alternative routing paths may be utilized when a first routing path is unavailable.

Moreover, while an example topology (e.g., layout) of the switched fabric network 90 is illustrated and described herein, it may be appreciated that the switched fabric network 90 may be implemented with any suitable topology. Accordingly, in some embodiments, additional or fewer nodes 96 may be included in the switched fabric network 90. For example, as described above, the switched fabric network 90 may be scaled using a set of additional nodes 96, such as any suitable number of processing nodes 84, to facilitate a particular data load. Accordingly, in some embodiments, the switched fabric network 90 may include any suitable number of visual processing nodes 84B to process a higher volume of visual and/or graphic data. The switched fabric network 90 may include any suitable number of audio processing nodes 84C to process a higher volume of audio information, the switched fabric network 90 may include any suitable number of physical effects processing nodes 84D to process any suitable amount of physical effect data, and/or the like. Additionally or alternatively, the interconnectivity of the switched fabric network 90 may be modified. For example, additional or fewer interconnects 94 and/or switches 92 may be included in the switched fabric network 90 to route data between nodes 96. Further, while the switched fabric network 90 is described herein as an INFINIBAND® network, the switched fabric network 90 may be implemented according to any suitable switched fabric network protocol. For example, in some embodiments, the switched fabric network 90 may be implemented using peripheral component interconnect express (PCIe) or another suitable high-speed internal communication standard. Thus, embodiments described herein are intended to be illustrative and not limiting.

An example of a process 110 for operating the interactive video system 10 is described in FIG. 3 and discussed below with reference to elements in FIGS. 1 and/or 2, in accordance with the present technique. It may be appreciated that, in other embodiments, certain steps of the illustrated process 110 may be performed in a different order, repeated multiple times, or skipped altogether, in accordance with the present disclosure. Further, the process 110 illustrated in FIG. 3 may be executed by nodes 96 of the switched fabric network 90. More specifically, the process 110 may be executed by a suitable combination of the input nodes 97, the output nodes 98, and/or the processing nodes 84 of the switched fabric network 90.

The illustrated embodiment of the process 110 begins with collecting (block 112) participant data at input nodes 97. In certain embodiments, the participants 12 may be scanned or imaged by the sensing units 38 positioned around the participation area 16. Additionally or alternatively, collecting participant data may involve determining an RF signal at the RF sensor 45. For example, in some embodiments, the RF sensor may determine a uniquely identifying RF signal from a wearable device 47, such as a bracelet or headband having a radio-frequency identification (RFID) tag worn by each of the participants 12. In response, the RF sensor 45 may provide signals regarding the identity and the relative positions of the participants 12 in the participation area 16, which may be captured in the participant data.

Continuing through the example process 110, next, one or more processing nodes 84 generate (block 114) a corresponding virtual representation for each participant based, at least in part on, the on the participant data collected at the input nodes. For example, in certain embodiments, the distributed control system 82 may route the collected scanning data from the sensing units 38 of the input nodes 97 to the processing nodes 84 via the switched fabric network 90. The processing nodes 84 may use the received scanning data as a basis to generate a virtual representation of a participant. It may be appreciated that, in certain embodiments, the virtual representations 14 may have a shape or outline that is substantially similar to the shadow model of the corresponding participant, which may be generated by the input nodes (e.g., volumetric sensor 40) and/or at the processing nodes 84 based in part on the collected participant data. In addition to shape, the virtual representations 14 may have other properties that can be modified to correspond to properties of the represented participant. For example, a participant may be associated with various properties (e.g., items, statuses, scores, statistics) that reflect their performance in other game systems, their purchases in a gift shop, their membership to a loyalty program, and so forth. Accordingly, properties (e.g., size, color, texture, animations, presence of virtual items) of the virtual representation may be set in response to the various properties associated with the corresponding participant, and further modified based on changes to the properties of the participant during game play. For instance, in some embodiments, the processing nodes 84 may request and/or receive additional participant data, such as the properties described above, from the database node 86 related to a particular participant based in part on the collected participant data, such as the signals provided by the RF sensor 45. The processing nodes 84 may then generate the virtual representation of the participant based in part on the additional participant data provided by the database node 86.

In certain embodiments, the distributed control system 82 may use any suitable combination of processing nodes 84 to generate the virtual representation of the participant. For example, as discussed above, the fusion processing node 84E may aggregate collected participant data from one or more input devices, such as the RF sensor 45 and the sensing units 38. Based in part on the aggregated collected participant data, the visual processing node 84B may determine a suitable signal to display the virtual representation via the one or more of the output nodes 98 (e.g., at the display device 24). Moreover, the database node 86, the AI processing node 84A, and/or any additional processing nodes 84, may be employed to generate the virtual representation and/or to provide additional information used by the visual processing node 84B to generate the virtual representation. To that end, as described above, processing tasks involved with implementing the interactive video system 10 may be distributed among one or more processing nodes 84, which may be specialized and/or optimized to perform particular processing tasks.

The illustrated process 110 continues with the interactive video system 10 outputting (e.g., presenting) (block 116), using the output nodes 98, the corresponding virtual representations 14 of each of the participants. For example, in some embodiments, the distributed control system 82 may route the virtual representations 14 from the one or more processing nodes 84 to one or more output nodes 98 via the switched fabric network 90, and the output nodes 98 may display the received virtual representations in the virtual environment 32 on the display device 24. In addition to presenting the virtual representations, in certain embodiments, the actions in block 118 may also include presenting, using one or more output nodes 98, other introductory presentations, such as a welcome message or orientation/instructional information, to the participants 12 in the presentation area 25 before game play begins.

Once game play begins, the virtual representations 14 generated in block 114 and presented in block 116 are capable of interacting with one another and/or with virtual objects in the virtual environment 32. During game play, the one or more processing nodes 84 generally determine (block 118) the in-game actions of each of the participants 12 in the participation area 16 based on the collected participant data. For example, the in-game actions may include jumping, running, sliding, or otherwise moving of the virtual representations 14 within the virtual environment 32. In-game actions may also include interacting with (e.g., moving, obtaining, losing, consuming) an item, such as a virtual object in the virtual environment 32. Additionally or alternatively, participants 12 may move, throw, and/or climb upon a physical prop (e.g., a ball, toy, climbing structure, and/or the like), which may be included in the participation area 16 and/or purchased at a gift shop, to produce in-game actions. In-game actions may also include completing a goal, defeating another participant, winning a round, or other similar in-game actions. Accordingly, the collected participant data may include data regarding the actions of the participants 12 disposed within the participation area 16. That is, for example, collecting (block 112) participant data may additionally involve collecting data from other devices (e.g., RF sensor 45, input devices 76) to capture the in-game actions of the participants 12. Accordingly, in some embodiments, the input nodes 97 may continue to capture participant data during game play.

Additionally, the one or more processing nodes 84 may determine in-game effects corresponding to these in-game actions. For example, the AI processing node 84A may determine in-game effects corresponding to particular game rules triggered by and/or associated with the in-game actions of the participants 12. Moreover, in some embodiments, certain calculations involved in determining the in-game effects may be offloaded to additional processing nodes 84, such as an additional AI processing node 84A. Furthermore, in certain embodiments, the distributed control system 82 may determine suitable signals to set or modify parameters of the virtual environment 32 within the presentation area 25 based in part on the in-game actions of the participants. For example, as described in greater detail below, the modifications may include adjusting house light brightness and/or color, playing game music or game sound effects, adjusting the temperature of the participation area, activating physical effects in the participation area, and so forth.

The distributed control system 82 generally updates (block 120), using the output nodes 98, the corresponding virtual representations 14 of the participants 12 and/or the virtual environment 32 based on the in-game actions of the participants 12 in the participation area 16 and the corresponding in-game effects determined in block 118. For example, distributed control system 82 may, using RDMA, directly update the data stored in a memory of a first node (e.g., at one or more output nodes 98) based on data stored in a memory of a second node (e.g., at a visual processing node 84B, the audio processing node 84C, the physical effects processing node 84D, the AI processing node 84A, and/or the like). The output nodes 98 may then supply suitable control signals to the associated output devices (e.g., audio devices 50, the display device 24, the output devices 78) to update the virtual environment 32 (e.g., update presentation in the presentation area 25) based on the received signals. As indicated by the arrow 122, one or more steps (e.g., block 118 and/or block 120) included in the process 110 may be repeated until game play is complete, for example, due to one of the participants 12 winning the round of game play or due to an expiration of an allotted game play time.

Figure 3:
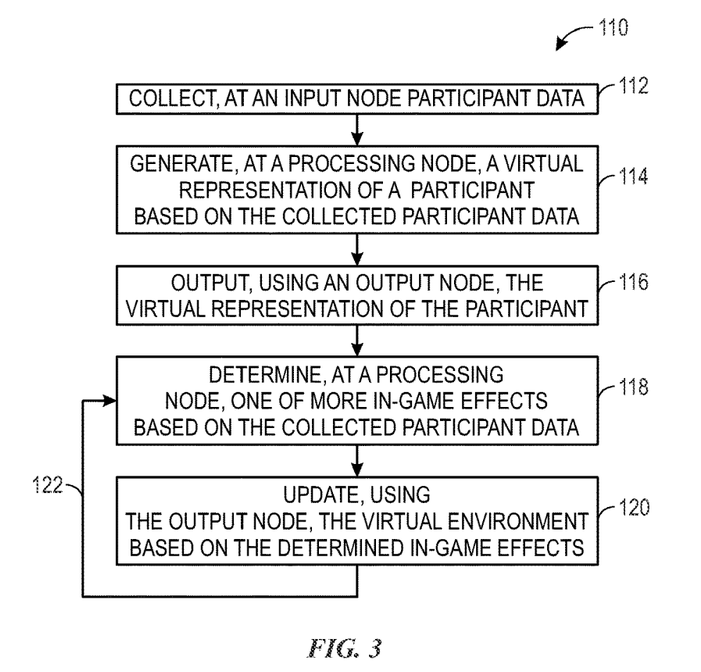
FIG. 3 is a flow diagram illustrating an embodiment of a process of operating the interactive video system, in accordance with the present technique.
Figure 4:
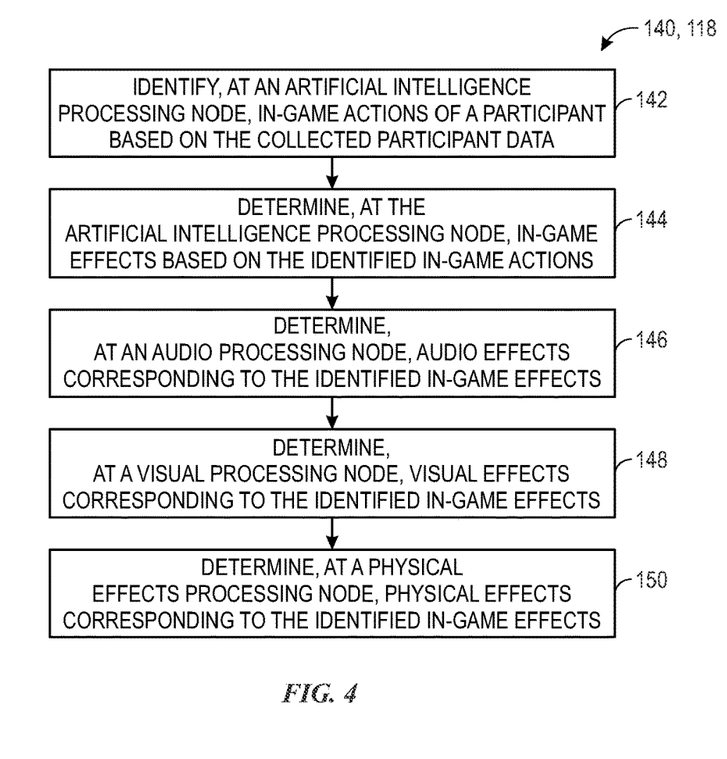
FIG. 4 is a flow diagram illustrating an embodiment of a process by which certain actions indicated in the flow diagram of FIG. 3 are performed, in accordance with the present technique.

FIG. 4 is an example embodiment of a process 140 for determining the in-game effects corresponding to in-game actions of each of the participants 12, corresponding to block 118 of FIG. 3, in accordance with the present technique. The process 140 is described below with reference to elements of FIGS. 1 and 2. Further, it may be appreciated that, in other embodiments, certain steps of the illustrated process 140 may be performed in a different order, repeated multiple times, or skipped altogether, in accordance with the present disclosure. Generally, the process 140 includes identifying in-game actions of participants, determining in-game effects based on these identified in-game actions, and updating the presentation of the virtual environment in the participation area based on the determined in-game effects. Moreover, while the process 140 illustrated in FIG. 4 is described herein as being performed by particular nodes (e.g., one or more processing nodes 84) of the distributed control system 82, the process 140 may be executed by any suitable combination of nodes 96 of the of the distributed control system 82.

The illustrated process 140 begins with one or more of the processing nodes 84 of the distributed control system 82 (e.g., AI processing node 84A) identifying (block 142) one or more in-game actions of the corresponding virtual representations 14 of each participant 12 based, at least in part, on the collected participant data. For example, the in-game actions may include jumping, running, sliding, or otherwise moving of the virtual representations 14 within the virtual environment 32. Accordingly, the one or more of the processing nodes 84 may identify the in-game actions based in part on data received from the input nodes 97 (e.g., from sensing units 38, RF sensor 45, input devices 76, and/or the like), implemented to capture the in-game actions of the participants 12.

Next, the illustrated process 140 continues with the one or more of the processing nodes 84 (e.g., AI processing node 84A) determining (block 144) one or more in-game effects triggered in response to the identified in-game actions of each of the participants 12. For example, when the determined in-game action is a movement of a participant, then the in-game effect may be a corresponding change in position of the corresponding virtual representation within the virtual environment. When the determined in-game action is a jump, the in-game effect may include moving the virtual representation along the y-axis 20, as illustrated in FIG. 1. When the determined in-game action is activating a particular power-up item, then the in-game effect may include modifying a status (e.g., a health status, a power status) associated with the participants 12. When the determined in-game action associated with the participant 12A is use of a physical prop, such as a foam sword, within the participation area 16, the in-game effect may include updating the virtual representation of the participant 12A in the virtual environment 32 to include a virtual representation corresponding to the physical prop, such as a virtual sword. Additionally, in certain cases, the movements of the virtual representations 14 may be accentuated or augmented relative to the actual movements of the participants 12. For example, as discussed above with respect to modifying the appearance of the virtual representation, the movements of a virtual representation of a participant may be temporarily or permanently exaggerated (e.g., able to jump higher, able to jump farther) relative to the actual movements of the participant based on properties associated with the participant, including items acquired during game play, items acquired during other game play sessions, items purchased in a gift shop, and so forth. Additionally, the in-game effects may include one or more sounds and/or physical effects.

Continuing through the embodiment illustrated in FIG. 4, the distributed control system 82 may determine suitable signals corresponding to one or more sounds (block 146), visual effects (block 148), and/or one or more physical effects (block 150) in the presentation area 25 based, at least in part, on the in-game effects determined in block 144. For example, when the in-game effect is determined to be a particular virtual representation of a participant crashing into a virtual swimming pool, the audio processing node 84C may determine a suitable signal to cause audio devices associated with the one or more of the output nodes 98 (e.g., audio devices 50) to generate suitable splashing sounds. Further, the visual processing node 84B may determine visual effects, such as an updated visual representation of the participant, to present at one or more of the output nodes 98 (e.g., at the display device 24). In some embodiments, the visual processing node 84B may utilize a number of GPUs 104C, which can be adjacent to or physically remote from one another, to determine the visual effects. Moreover, the physical effects processing node 84D may determine suitable signals to cause the output nodes 98 and associated output devices 78 to generate a blast of mist. Additionally, sounds and/or physical effects may be produced in response to any number of in-game effects, including, for example, gaining a power-up, losing a power-up, scoring a point, or moving through particular types of environments.

The technical effects of the present approach include an interactive video system that enables multiple participants (e.g., two or more, four or more) to perform actions in a physical participation area to control corresponding virtual representations in a virtual environment presented on a display device of a presentation area near the participation area. More specifically, the system can create real-time interactive experiences that are smooth and responsive to participant interaction, and the system can also efficiently scale to facilitate a greater number of participants, higher throughput of data processing, and/or the like. To do so, the disclosed system includes a distributed control system implemented in a switched fabric network. The switched fabric network interconnects a number of nodes, such as input nodes (e.g., input devices), output nodes (e.g., output devices), and processing nodes (e.g., computing devices). Further, the switched fabric network may facilitate low-latency, high bandwidth communication, as well as remote direct memory access (RDMA), between its nodes. As a result of the low-latency communication, and since the processing nodes can include specialized processors optimized to perform specific computing tasks, the operations involved with controlling the system can be distributed across a number of processing nodes and/or specialized processors for more rapid handling. Moreover, because the switched fabric network may accommodate processing nodes in physically distinct locations (e.g., in separate chassis), additional processing nodes can be efficiently added to the network on or off-site from the system, increasing the scalability of the system.

While only certain features of the present technique have been illustrated and described herein, many modifications and changes will occur to those skilled in the art. It is, therefore, to be understood that the appended claims are intended to cover all such modifications and changes as fall within the true spirit of the present technique. Additionally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive video system, comprising:
a switched fabric network including a plurality of switches interconnecting a plurality of nodes, wherein the plurality of nodes comprises:
   at least one input node comprising a sensing unit configured to collect scanning data of a participant in a participation area of the interactive video system;
   at least one artificial intelligence (AI) processing node configured to identify an in-game action of the participant based at least in part on the scanning data of the participant and determine an in-game effect corresponding to the in-game action;
   at least one audio processing node configured to determine an audio effect corresponding to the in-game effect; and
   at least one audio output node comprising an audio output device configured to present the audio effect to the participant in the participation area of the interactive video system, wherein each node of the plurality of nodes is coupled to at least two switches of the plurality of switches of the switched fabric network.

2. The interactive video system of claim 1, wherein the plurality of nodes comprises:
   at least one visual processing node configured to generate a virtual representation of the participant based at least in part on the scanning data of the participant; and
   at least one visual output node comprising a visual output device configured to present the virtual representation to the participant in the participation area of the interactive video system.

3. The interactive video system of claim 2, wherein the at least one visual processing node is configured to determine a visual effect corresponding to the in-game effect, and wherein the at least one visual output node is configured to update the presentation of the virtual representation of the participant on the visual output device based on the visual effect.

4. The interactive video system of claim 1, wherein the plurality of nodes comprises:
   at least one physical effect processing node configured to determine a physical effect corresponding to the in-game effect; and
   at least one physical effect output node comprising a physical effect output device configured to present the physical effect to the participant in the participation area of the interactive video system.

5. The interactive video system of claim 4, wherein the at least one physical effect processing node comprises a field-programmable gate array (FPGA).

6. The interactive video system of claim 1, wherein the plurality of nodes comprises:
   a plurality of input nodes, each comprising a respective sensing unit configured to collect a respective portion of the scanning data of the participant in the participation area of the interactive video system; and
   an input fusion processing node configured to aggregate the respective portion of the scanning data collected by each respective sensing unit of the plurality of input nodes, and wherein the input fusion processing node comprises an application-specific integrated circuit (ASIC).

7. The interactive video system of claim 1, wherein the plurality of nodes comprises:
   a plurality of audio output nodes, each comprising a respective audio output device configured to present a respective portion of the audio effect to the participant in the participation area of the interactive video system; and
   an output fusion processing node configured to determine the respective portion of the audio effect to be presented by the respective audio output device of each of the plurality of audio output nodes.

8. The interactive video system of claim 1, wherein the at least one AI processing node is disposed within a first chassis and the at least one audio processing node is disposed within a second chassis distinct from the first chassis.

9. The interactive video system of claim 1, wherein the at least one AI processing node comprises a tensor processing unit (TPU), a first vector processing unit (VPU), or a combination thereof, and wherein the at least one audio processing node comprises a second VPU that is distinct from the first VPU.

10. The interactive video system of claim 1, wherein the at least one AI processing node is configured to access the at least one input node via remote direct memory access (RDMA).

11. The interactive video system of claim 1, wherein the switched fabric network is implemented using peripheral component interconnect express (PCIe) connectivity.

12. A method of operating an interactive video system having a switched fabric network that includes a plurality of nodes, the method comprising:
   collecting, via at least one input node of the plurality of nodes, scanning data of a participant in a participation area of the interactive video system;
   identifying, via at least one artificial intelligence (AI) processing node of the plurality of nodes, an in-game action of the participant based at least in part on the scanning data of the participant;
   determining, via the at least one AI processing node, an in-game effect corresponding to the in-game action;
   determining, via at least one audio processing node of the plurality of nodes, an audio effect corresponding to the in-game effect;
   presenting, via an audio output device of at least one audio output node of the plurality of nodes, the audio effect to the participant in the participation area of the interactive video system;
   determining, via at least one physical effect processing node of the plurality of nodes, a physical effect corresponding to the in-game effect; and
   presenting, via a physical effect output device of at least one physical effect output node of the plurality of nodes, the physical effect to the participant in the participation area of the interactive video system.

13. The method of claim 12, wherein each node of the plurality of nodes is coupled to at least two switches of a plurality of switches of the switched fabric network.

14. The method of claim 12, comprising:
   generating, via at least one visual processing node of the plurality of nodes, a virtual representation of the participant based at least in part on the scanning data of the participant; and
   presenting, via a visual output device of a visual output node of the plurality of nodes, the virtual representation to the participant in the participation area of the interactive video system.

15. The method of claim 14, comprising:
   determining, via the at least one visual processing node, a visual effect corresponding to the in-game effect; and updating, via the visual output device of the visual output node, the virtual representation of the participant based on the visual effect.

16. An interactive video system, comprising:
a switched fabric network having a plurality of nodes, including:
- at least one input node comprising a sensing unit configured to collect scanning data of a participant in a participation area of the interactive video system;
- at least one artificial intelligence (AI) processing node configured to identify an in-game action of the participant based at least in part on the scanning data of the participant and to determine an in-game effect corresponding to the in-game action;
- at least one visual processing node configured to generate a virtual representation of the participant based at least in part on the scanning data of the participant and to determine a visual effect corresponding to the in-game effect; and
- at least one visual output node comprising a visual output device configured to present the virtual representation to the participant in the participation area of the interactive video system and to update the presentation of the virtual representation based on the visual effect;
- at least one audio processing node configured to determine an audio effect corresponding to the in-game effect; and
- at least one audio output node comprising an audio output device configured to present the audio effect to the participant in the participation area of the interactive video system.

17. The interactive video system of claim 16, wherein each node of the plurality of nodes is coupled to at least two switches of the plurality of switches of the switched fabric network.

18. The interactive video system of claim 16, wherein the plurality of nodes comprises:
- at least one physical effect processing node configured to determine a physical effect corresponding to the in-game effect; and
- at least one physical effect output node comprising a physical effect output device configured to present the physical effect to the participant in the participation area of the interactive video system.

19. The interactive video system of claim 16, wherein the at least one input node comprises a radio-frequency (RF) sensor, and wherein the scanning data comprises data indicating an identity, a location, or a combination thereof, collected at the RF sensor for the participant.

20. The interactive video system of claim 16, wherein the at least one input node comprises a plurality of input nodes having a respective plurality of sensing units configured to collect respective scanning data for each of a plurality of participants within the participation area of the interactive video system.

* * * * *